(12) United States Patent
Blandy et al.

(10) Patent No.: US 6,704,926 B1
(45) Date of Patent: Mar. 9, 2004

(54) BIMODAL JAVA JUST-IN-TIME COMPLIER

(75) Inventors: Geoffrey Owen Blandy, Austin, TX (US); Andrew Johnson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 09/671,769

(22) Filed: Sep. 28, 2000

(51) Int. Cl.[7] ............................. G06F 9/45; G06F 9/44
(52) U.S. Cl. ........................................ 717/148; 717/118
(58) Field of Search .................... 717/118, 136–140, 717/145–148; 712/202, 226, 229

(56) References Cited

U.S. PATENT DOCUMENTS

| | | | | |
|---|---|---|---|---|
| 5,563,648 A | * | 10/1996 | Menand et al. | 725/142 |
| 5,765,221 A | * | 6/1998 | Rossbach et al. | 711/220 |
| 6,077,311 A | * | 6/2000 | Lichtenstein et al. | 717/128 |
| 6,115,550 A | * | 9/2000 | Hunter et al. | 717/162 |
| 6,125,439 A | * | 9/2000 | Tremblay et al. | 712/202 |
| 6,233,725 B1 | * | 5/2001 | Beadle et al. | 717/118 |
| 6,249,907 B1 | * | 6/2001 | Carter et al. | 717/129 |
| 6,412,107 B1 | * | 6/2002 | Cyran et al. | 717/148 |

* cited by examiner

*Primary Examiner*—Todd Ingberg
*Assistant Examiner*—Lawrence Shrader
(74) *Attorney, Agent, or Firm*—Duke W. Yee; Volel Emile; Wayne P. Bailey (57) ABSTRACT

A process in a data processing system for just-in-time compiling instructions. A set of non-specific data processing system instructions for a method are received. Addresses are placed into a set of functions. The set of non-specific data processing system instructions are processed using an intermediate code generation process to generate a set of instructions for execution using a particular mode of addressing.

33 Claims, 5 Drawing Sheets

```
         1200
           ↘ ifdef __64BIT__
define    ldp  ld8
#else
#define    ldp  ld4
end if define    Ild4    0x0808000000
define    Ild4    0x080c000000
#define    L(x)L2(x)
define    L2(x)   x##LL op = ldp;   /*generic load pointer instruction */
switch (op) {
case ld4:
        opcode = L(Ild4)
        break;
case ld1:
        opcode = L(Ild8);
        break;
}
```

BIMODAL JAVA JUST-IN-TIME COMPLIER

BACKGROUND OF THE INVENTION

1. Technical Field

The present invention provides an improved data processing system and in particular, a method and apparatus for compiling instructions. Still more particularly, the present invention provides a method and apparatus for compiling instructions for different modes of addressing.

2. Description of Related Art

Java is an object oriented programming language and environment focusing on defining data as objects and the methods that may be applied to those objects. "Java" is a trademark of Sun Microsystems, Inc. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software to different computing platforms.

Java is able to support applications for many types of data processing systems, which may contain a variety of central processing units and operating system architectures. The Java Virtual Machine (JVM) is a virtual computer component that resides only in memory. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format. The compiled code is executable on many processors, given the presence of the Java runtime system. The Java compiler generates bytecode instructions that are non-specific to particular computer architectures. A bytecode is a machine independent code generated by the Java compiler and executed by a Java interpreter. A Java interpreter is a module in the JVM that alternatively decodes and executes a bytecode or bytecodes. These bytecode instructions are designed to be easy to interpret on any machine and easily translated on the fly into native machine code.

A development environment, such as the Java Development Kit (JDK) available from Sun Microsystems, Inc., may be used to build Java bytecode from Java language source code and libraries. This Java bytecode may be stored as a Java application or applet on a Web Server, where it can be downloaded over a network to a user's machine and executed on a local JVM. When extra speed in executing a Java program is needed, a Just In Time (JIT) compiler may be used to translate bytecodes for a method or class into native machine instructions before executing them. This can occur as late as when a method is first executed, or possibly later still, on a subsequent method invocation, with previous method invocations being interpreted rather executing compiled code.

Some operating systems are able to run applications in more than one addressing mode. For example, with 64-bit processors, some operating systems may run an application program in one mode in which the application has full access to the 64-bit address space. In another mode, addresses are only 32-bits in size. This 32-bit addressing mode is used for compatibility reasons. This mode makes porting applications from other 32-bit operating systems easier because C language pointers remain the same size as integers. In one such operating system, Advanced Interactive Executive (AIX) 5L for IA-64, a product of International Business Machines Corporation in Armonk, N.Y., the same instructions are used in 32-bit mode, and all of the registers are the same size as in 64-bit mode. In 32-bit mode, pointer variables are read as 32-bit quantities from memory and are extended to 64-bit values in registers before they are used.

With these different types of addressing modes, JIT compilers are required to be designed for particular modes of addressing. Presently, different JIT compilers are designed and built for 32-bit mode addressing and 64-bit mode addressing.

Therefore, it would be advantageous to have an improved method and apparatus for a compiler that is capable of running in different modes of addressing and generate code, which can be executed in that mode.

SUMMARY OF THE INVENTION

The present invention provides a process in a data processing system for just-in-time compiling instructions. A set of non-specific data processing system instructions for a method are received. Addresses are placed into a set of functions. The set of non-specific data processing system instructions are processed using an intermediate code generation process to generate a set of instructions for execution using a particular mode of addressing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
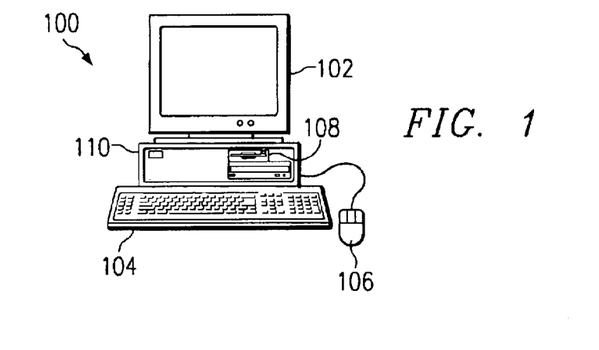
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

Figure 2:
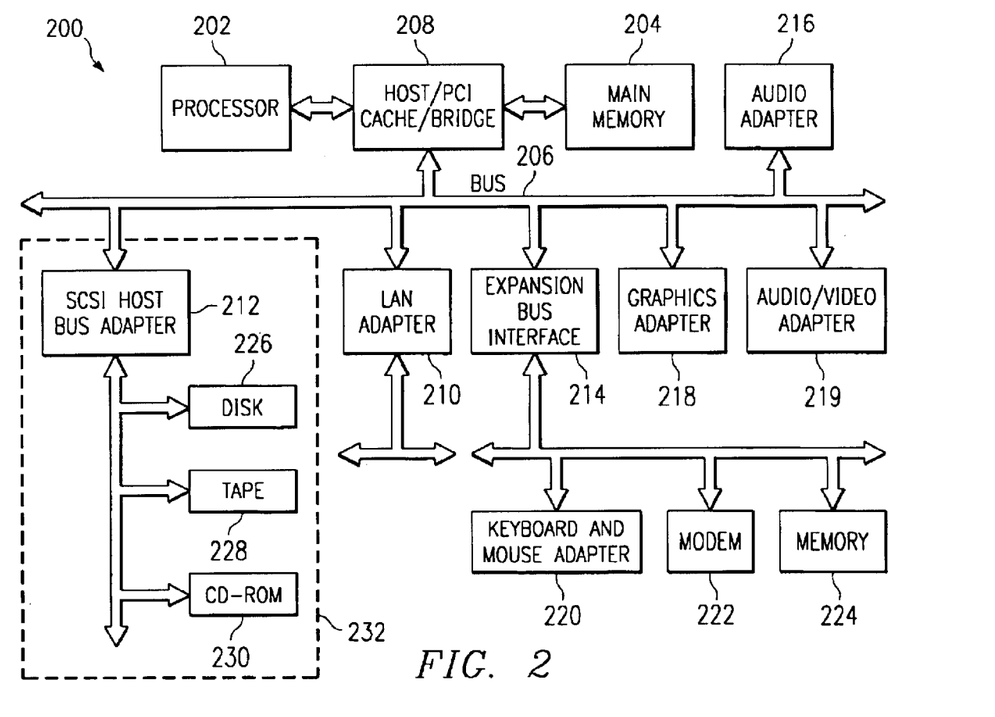
FIG. 2 is a block diagram of a data processing system is shown in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

In these examples, the mechanisms of the present invention are implemented in a data processing system, such as data processing system 200 in which an Intel IA-64 architecture processor is present. More information in the IA-64 architecture may be found in *Intel IA-64 Architecture Software Developer's Manual, Volume* 1: *IA-64 Application Architecture, Revision* 1.1, *July* 2000.

Figure 3:
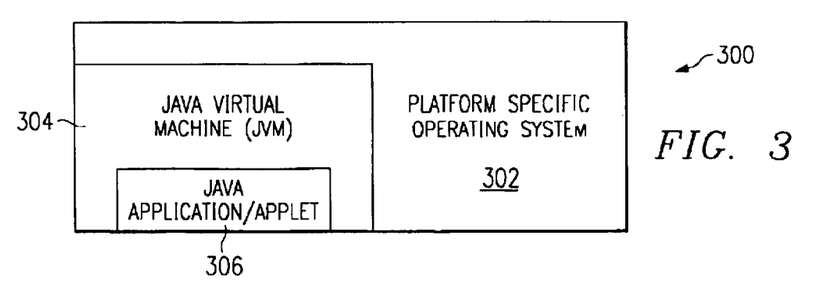
FIG. 3 is a block diagram illustrates the relationship of software components operating within a computer system that may implement the present invention.

With reference now to FIG. 3, a block diagram illustrates the relationship of software components operating within a computer system that may implement the present invention. Java-based system 300 contains platform specific operating system 302 that provides hardware and system support to software executing on a specific hardware platform. Java Virtual Machine (JVM) 304 is one software application that may execute in conjunction with the operating system. JVM 304 provides a Java run-time environment with the ability to execute Java application or applet 306, which is a program, servlet, or software component written in the Java programming language. The computer system in which JVM 304 operates may be similar to data processing system 200 in FIG. 2 or computer 100 in FIG. 1 described above. However, JVM 304 may be implemented in dedicated hardware on a so-called Java chip, Java-on-silicon, or Java processor with an embedded picoJava core. At the center of a Java run-time environment is the JVM, which supports all aspects of Java's environment, including its architecture, security features, mobility across networks, and platform independence.

The JVM is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM is the name of a virtual computer component that actually executes Java programs. Java programs are not run directly by the central processor but instead by the JVM, which is itself a piece of software running on the processor. The JVM allows Java programs to be executed on a different platform as opposed to only the one platform for which the code was compiled. Java programs are compiled for the JVM. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

A JVM must load class files and execute the bytecodes within them. The JVM contains a class loader, which loads class files from an application and the class files from the Java application programming interfaces (APIs) which are needed by the application. The execution engine that executes the bytecodes may vary across platforms and implementations.

One type of software-based execution engine is a Just-In-Time (JIT) compiler. With this type of execution, the bytecodes of a method are compiled to native machine code upon successful fulfillment of some type of criteria for "jitting" a method. The native machine code for the method is then cached and reused upon the next invocation of the method. The execution engine may also be implemented in hardware and embedded on a chip so that the Java bytecodes are executed natively. JVMs may interpret bytecodes or use other techniques, such as Just-In-Time (JIT) compiling, to execute bytecodes. It is not uncommon for a JVM to interpret some methods and JIT compile others.

When an application is executed on a JVM that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library (DLL) whose exact form is platform specific.

Figure 4:
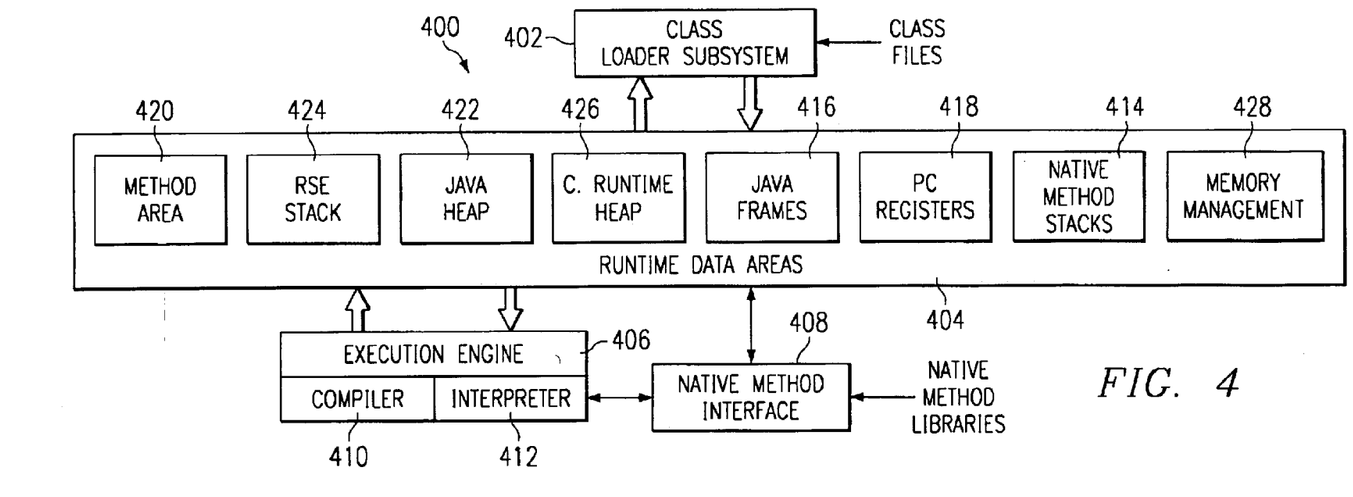
FIG. 4 is a block diagram of a JVM in accordance with a preferred embodiment of the present invention.

With reference now to FIG. 4, a block diagram of a JVM is depicted in accordance with a preferred embodiment of the present invention. The mechanism of the present invention may be implemented within JVM 400. JVM 400 includes a class loader subsystem 402, which is a mechanism for loading types, such as classes and interfaces, given fully qualified names. JVM 400 also contains runtime data areas 404, execution engine 406, native method interface 408, and memory management 428. Execution engine 406 is a mechanism for executing instructions contained in the methods of classes loaded by class loader subsystem 402. Execution engine 406 may be, for example, Java interpreter 412 or just-in-time compiler 410. Native method interface 408 allows access to resources in the underlying operating system. Native method interface 408 may be, for example, a Java native interface.

Runtime data areas 404 contain native method stacks 414, Java frames 416, PC registers 418, method area 420, heap 422, register stack engine (RSE) stacks 424, and C runtime heap 426. These different data areas represent the organization of memory needed by JVM 400 to execute a program.

Java frames 416 are used to store the state of Java method invocations. When a new thread is launched, the JVM creates a new Java stack from which the thread will allocate Java Frames. A thread is a part of a program, i.e. a transaction or message, that can execute independently of other parts. In a multithreaded environment, multiple streams of execution may take place concurrently within the same program, each stream processing a different transaction or message.

A Java frame contains all the information pertaining to a single method invocation and is commonly partitioned into three regions. The first region holds all local variables including the input parameters. The second region is typically fixed in size and contains various pointers used by the interpreter including a pointer to the previous frame. The third region is the Java operand stack which is a FIFO stack that holds operands and results of bytecode operations. The operand stack is also used to pass parameters during invocation. The JVM performs only two operations directly on Java operand stacks: it pushes and pops stack items. These items may be object references or primitives such as integers or floating point values.

When the interpreter 412 invokes a Java method, the interpreter 412 saves the return PC, i.e. a bytecode pointer, in the current frame and makes an indirect call via a JVM invoker field in a method block of the Java method, as described in greater detail hereafter. Upon return from the JVM invoker, the interpreter fetches the current frame and resumes execution starting with the bytecode specified in the returnPC field. When an interpreted method completes, the current frame is discarded and the previous frame is made current.

Note that the JVM invoker field will point to different routines depending on the characteristics of the target method. For an interpreted method the JVM invoker routine allocates and initializes a Java frame and sets returnPC to the first bytecode of the called method. The new frame is made current and the JVM invoker returns to the interpreter to execute the method. For native and compiled code, the JVM invoker passes control to the called method and when a return is made to the interpreter the current frame is the same as when the call was made. By fetching the returnPC of the current frame, the interpreter resumes execution of the calling method. The JVM does not have any registers for holding intermediate values; any Java instruction that requires or produces an intermediate value uses the operand stack for holding the intermediate values. In this manner, the Java instruction set is well-defined for a variety of platform architectures.

PC registers 418 are used to indicate the next instruction to be executed. Each instantiated thread gets its own pc register (program counter) and Java stack. If the thread is executing a JVM method, the value of the pc register indicates the next instruction to execute. If the thread is executing a native method, then the contents of the pc register are undefined.

Native method stacks 414 store the state of invocations of native methods. The state of native method invocations is stored in an implementation-dependent way in native method stacks, registers, or other implementation-dependent memory areas. In some JVM implementations, native method stacks 414 and Java frames 416 are combined.

Method area 420 contains class data while Java heap 422 contains all instantiated objects. The JVM specification strictly defines data types and operations. When JVM 400 loads a class file, it parses information about a type from the binary data contained in the class file. JVM 400 places this type information into the method area. Each time a class instance or array is created, the memory for the new object is allocated from heap 422. JVM 400 includes an instruction, which allocates memory space within the memory for heap 422, but includes no instruction for freeing that space within the memory.

Memory management 428 in the depicted example manages memory space within the memory allocated to heap 422. Memory management 428 may include a garbage collector which automatically reclaims memory used by objects that are no longer referenced. Additionally, a garbage collector also may move objects to reduce heap fragmentation.

The present invention is equally applicable to either a platform specific environment, i.e. a traditional computer application environment loading modules or native methods, or a platform independent environment, such as an interpretive environment, e.g., a Java environment loading classes, methods and the like.

The present invention provides a method, apparatus, and computer implemented instructions for providing a JIT compiler, which is able to run in multiple modes. In the depicted examples, the JIT compiler is a bimodal JIT compiler. In the depicted examples, the JIT compiler itself is written in portable C code, with appropriate data types to represent integers that can also hold pointers etc. Using a portable code for the JIT compiler means that the JIT compiler can be just recompiled to operate in a different mode and run in that different mode.

The JIT compiler generates instructions as it compiles the target program. At an intermediate stage of code generation the compiler generates pseudo or intermediate instructions, which change according to the addressing mode.

For example, if code to access an array of pointers is generated as follows:

```
shladd    r22=r21, pointer_size, r20    //develop element
address from array base and index
;;
ldp       r23=[r22]
``` then the definition of ldp is defined to be ld4 in 32-bit mode and ld8 in 64-bit mode and pointer_size is either 4 or 8.

Additionally, the JIT compiler includes some assembler subroutines, which are called by the compiled application code. By providing subroutines, less code is required in JIT compiling bytecodes. These routines are required to operate in both 32-bit addressing mode and 64-bit addressing mode in these examples. Instructions accessing pointer type data can be made bimodal by using macros. For example, if a pointer value is being read from memory, then in 32-bit mode it may need to use a 'ld4' instruction and in 64-bit mode a 'ld8' instruction. By using a macro 'ldp', the actual source code in the routine need not change between when the routine is assembled for 32-bit mode and when the code is assembled for 64-bit mode as follows:

```
ldp    r20=[r21]            // read a pointer value
;;
add    r20=offset_struct1_field1    // get the field address
;;
ld2    r22=[r20]            // use the pointer value
;;
sxt    r22=r22
```

Other instructions require offsets of data in C language data structures.

The actual JIT compiler may be compiled on a different platform ("cross compiled") from the one it will execute on. One way of determining the appropriate offsets for the assembler subroutines to use is to create a C language program defining variables holding the values of the desired constants. For example:

```
struct structA {
    int a;
    char b;
    short field;
};
size_t offset_structA_field1 = offsetof (struct structA, field);
```

This program is then compiled with the C cross-compiler using the appropriate option for 32-bit or 64-bit execution and the appropriate option to generate an assembly language listing as follows:

```
            offset_structA_field1:
                data4    0x00000008
```

This assembly listing is then automatically processed to extract the symbols and their initial values as follows:

offset_structA_field1=0x00000008

Alternatively, the listing file can be processed in a similar fashion:

field1
int in struct structA at offset 8
post processed to:
offset_structA_field1=8

The assembler subroutines may need to call other subroutines in different modules. The calling sequence can be different in different modes.

Destination addresses for subroutines and the global data area for the subroutines used by the JIT compiler are known at initialization. As a result, these destination addresses can be directly patched into the routine. Normally the routine would be in non-writable relocatable shared code. These routines, however, are called from JITted code, and the JITed code resides in a buffer with read/write/execute permissions. The JIT routines are copied to this buffer so that they are at nearby addresses so are accessible via instruction pointer relative branches. This means that the routines can be modified at initialization and the real destination addresses patched into the code so that at run time they are loaded as immediate constants. For example:

```
movl        r20 = 0              //patch this with the
address of the subroutine
movl        r1 = 0               //patch this with the
address of the global data area of the routine
;;
mov         b6=r20
br.call     b0=b6
```

As a result, the address to be patched can be calculated at initialization.

Figure 5:
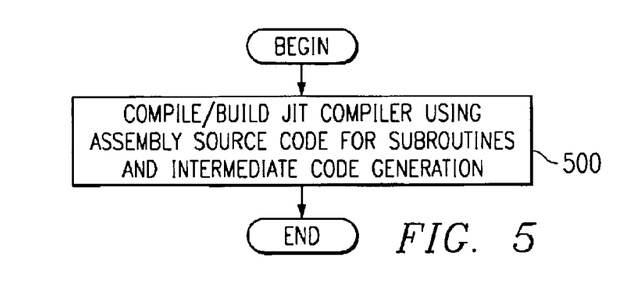
FIG. 5 is a flowchart of a process used for creating a bimodal JIT compiler in accordance with a preferred embodiment of the present invention.

Turning next to FIG. 5, a flowchart of a process used for creating a bimodal JIT compiler is depicted in accordance with a preferred embodiment of the present invention. The process begins by compiling/building JIT compiler using assembly source code for subroutines and intermediate code generation process(step 500) with the process terminating thereafter.

Figure 6:
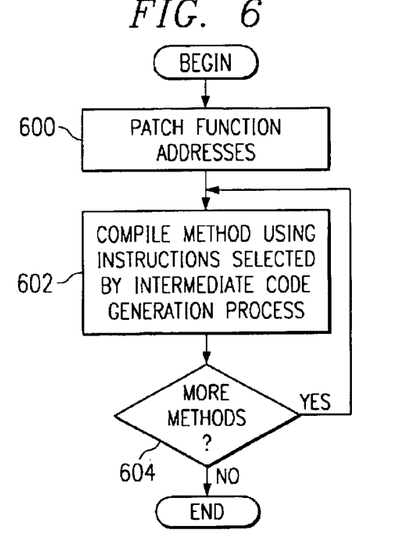
FIG. 6 is a flowchart of a process for compiling methods using a bimodal JIT compiler in accordance with a preferred embodiment of the present invention.

With reference now to FIG. 6, a flowchart of a process for compiling methods using a bimodal JIT compiler is depicted in accordance with a preferred embodiment of the present invention. The process illustrated in FIG. 6 is implemented in a JIT Java compiler created using the process in FIG. 5.

The process begins by patching function addresses (step 600). These addresses may be located by using a descriptor containing the address of the target routine. Next, a method is compiled using instructions selected using an intermediate instruction process (step 602). A determination is then made as to whether there are more methods (step 604). If additional methods are absent, the process terminates. Otherwise, the process returns to step 602 to obtain another method for processing.

Figure 7:
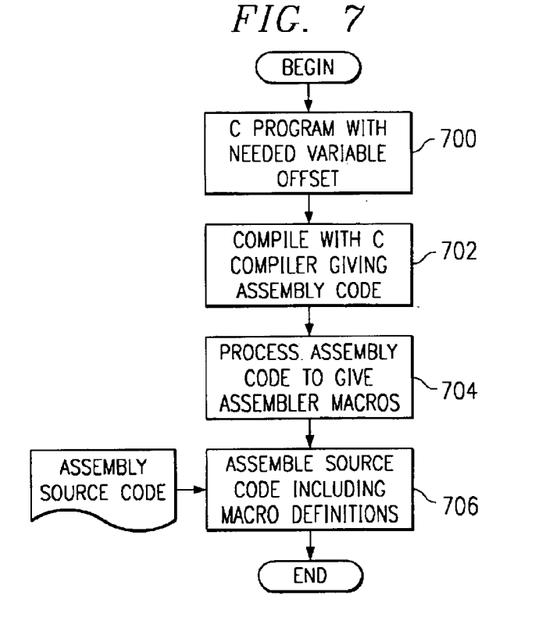
FIG. 7 is a flowchart of a process used for generating subroutines including macro definitions used to obtain offset values for variables in accordance with a preferred embodiment of the present invention.

Turning next to FIG. 7, a flowchart of a process used for generating subroutines including macro definitions used to obtain offset values for variables is depicted in accordance with a preferred embodiment of the present invention. The process in FIG. 7 is used in step 700 in FIG. 5 to compile and build a JIT compiler in accordance with a preferred embodiment of the present invention.

The process begins by receiving a C program with needed variable offsets (step 700). The offsets are used to obtain a field or variable from a data structure. The C program is compiled with a C compiler to obtain assembly code (step 702). Next, the assembly code is processed to obtain assembler macros (step 704). In essence, the assembly code is placed into a format following a definition for macros in assembly code. Then, assembly source code for subroutines is received (step 706). The assembly source code for obtaining offsets to variables is assembled with assembly source code for subroutines, which require offsets to access data (step 708) with the process terminating thereafter.

Figure 8:
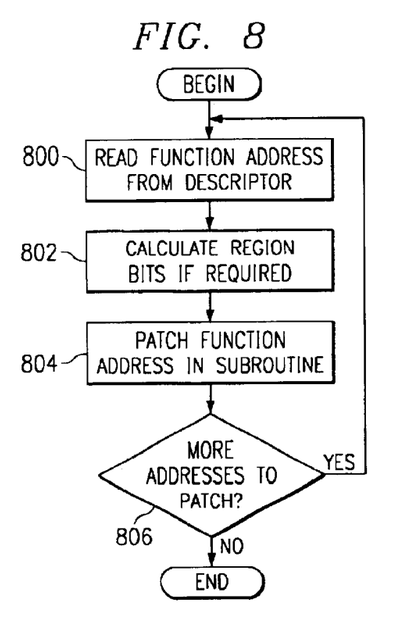
FIG. 8 is a flowchart of a process used for patching function addresses into a subroutine in accordance with a preferred embodiment of the present invention.

Turning next to FIG. 8, a flowchart of a process used for patching function addresses into a subroutine is depicted in accordance with a preferred embodiment of the present invention. The process illustrated in FIG. 8 is a more detailed description of step 600 in FIG. 6.

The process begins by reading a function address from a descriptor (step 800). A descriptor contains an address of a subroutine, as well as global data areas used by the subroutine. Next, region bits are calculated if required (step 802). Step 802 is an optional step. In certain operating systems the address space is mapped into regions, with for example shared code in one region and private data in another. On the IA-64 the regions is represented by bits 61–63 (the upper 3 bits) of the virtual address. With 32-bit addressing it is useful to be able to map the addresses of subroutines into different regions. This is done by taking some bits from the 32-bit function address and copying them into the region bits so as to give a 64-bit address. The function address obtained from the descriptor is patched into the subroutine (step 804). A determination is then made as to whether there are more addresses to patch (step 806). If there are no more addresses to patch, the process terminates.

With reference again to step 806, if there are more addresses to patch, the process returns to step 800. A subroutine can have more than one place where an address is patched into it.

Figures 9, 10:
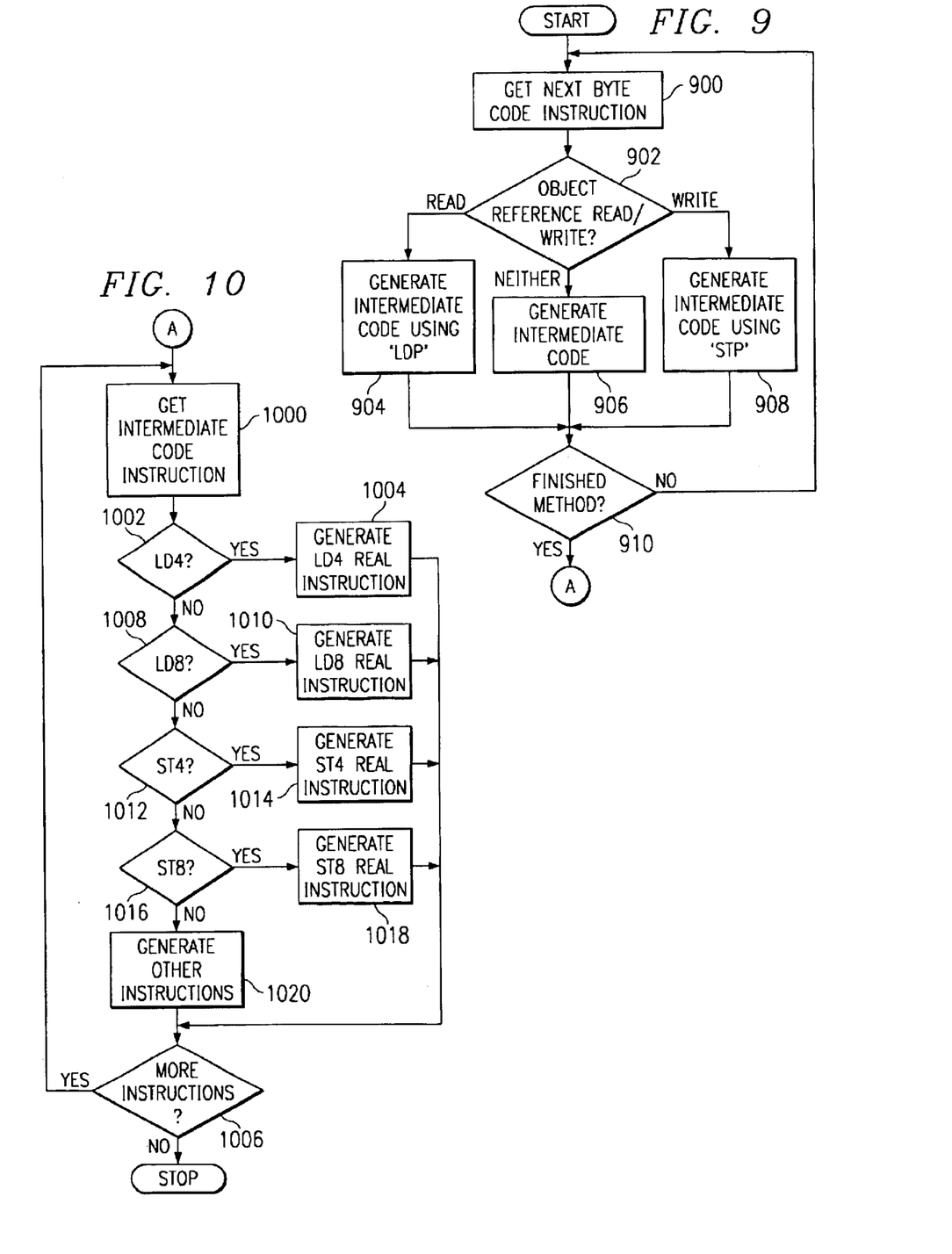
FIG. 9 is a flowchart of a process used generating intermediate code in accordance with a preferred embodiment of the present invention.
FIGS. 10 and 11 are flowcharts illustrating code generation based on addressing modes in accordance with a preferred embodiment of the present invention.

With reference now to FIG. 9, a flowchart of a process used generating intermediate code is depicted in accordance with a preferred embodiment of the present invention. The process of FIG. 9 is implemented within JIT compiler in these examples.

The process begins by obtaining a next bytecode instruction (step 900). The step obtains an unprocessed or uncompiled bytecode for the method. Then, an identification of the type of the bytecode is made. A determination is made whether it is a bytecode which will compile to code including a read or a write of a reference to a Java object (a pointer) held in memory (step 902). Java object references are 32 bits in size in 32-bit mode and 64 bits in 64-bit mode. Different code needs to be generated to access these references in each mode. If the object reference is a read, an intermediate instruction code is generated using a "LDP" pseudo-instruction (step 904). "LDP" stands for "LoaD Pointer from memory" and represents a LD4 (load a 4-byte quantity from memory) instruction in 32-bit mode and LD8 (load an 8-byte quantity from memory) in 64-bit mode.

If in step 902, the object reference is neither a read or write, intermediate instruction code is generated (step 906). A single intermediate instruction code is a representation of an IA-64 instruction but with details such as the actual register number replaced by a virtual register number because the mapping of virtual registers to actual registers has not been decided at this step in the compilation process. A representation of an intermediate code instruction could be as shown here:

```
typedef struct instruction{
    struct instruction *next;     /* linked list chain */
    unsigned char    inst_type;   /* memory/arithmetic etc.*/
    unsigned char    qp;          /* predicate */
    unsigned char    opcode;      /* base instruction */
    unsigned char    UNUSED;
    unsigned short   pc;
      signed short   depends;
    unsigned short   uFlag;
    unsigned short   short1;      /* data/virtual register
number etc. */
    union {
        uint64_t i64;
        struct s64 s64;
    }u64; /* more data/virtual register numbers */
{ir;
```

Referring back to step 902, if the object reference is a write, an intermediate code using "STP" is generated (step 908). "STP" stands for "STore Pointer into memory" and represents a ST4 (store a 4-byte quantity into memory) instruction in 32-bit mode and ST8 (store an 8-byte quantity into memory) in 64-bit mode.

After each code generation step, a determination is made as to whether the method is finished (step 910). In other words a determination is made as to whether all of the bytecodes for the method have been processed. If the method is not finished, the process returns to step 900. If the method is finished then the process will proceed to generate real instructions depending on the mode of addressing.

Figures 11, 12:
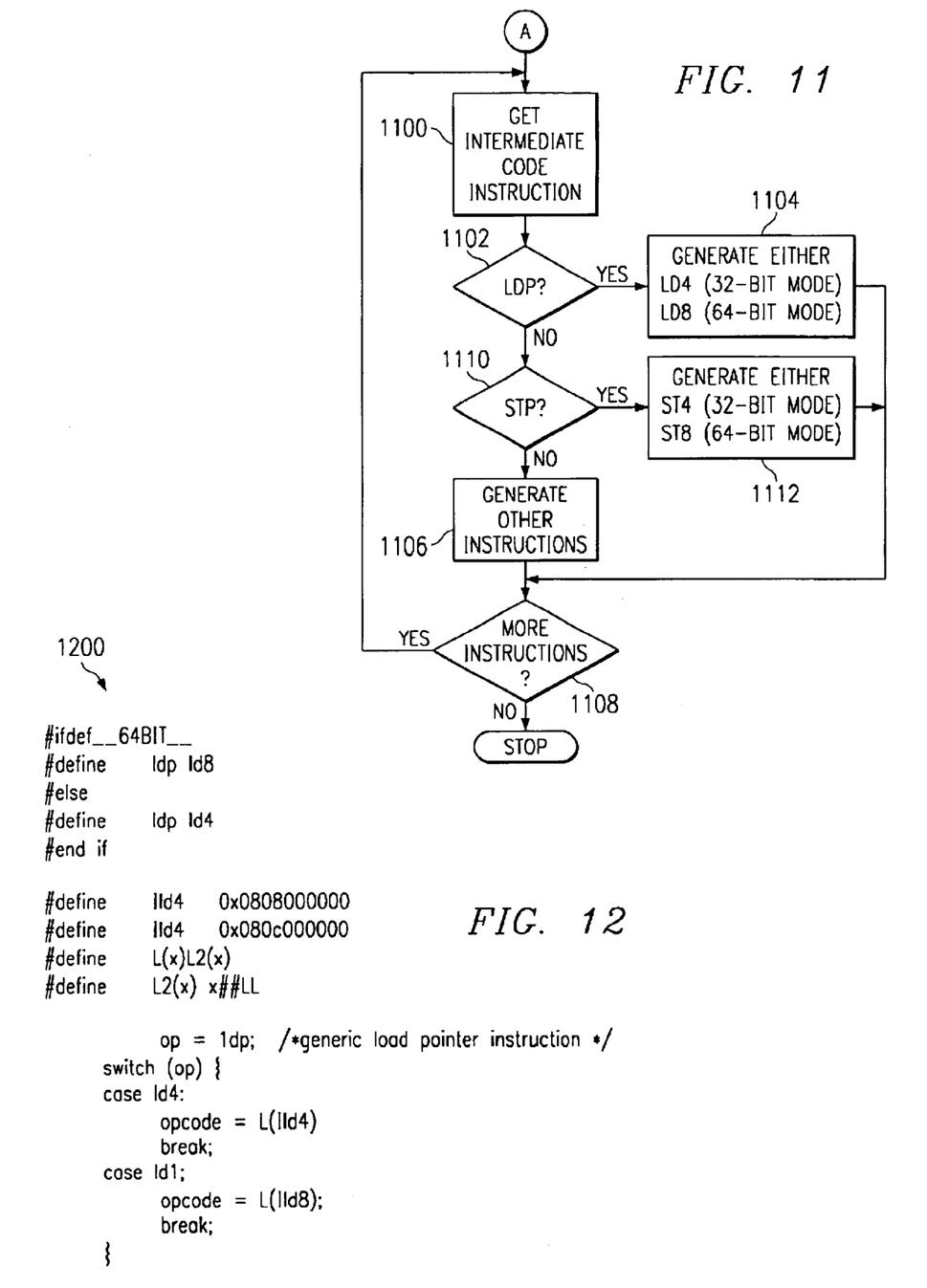
FIG. 12 is a diagram of code illustrating macros used to represent different instructions in 32-bit and 64-bit modes of addressing in accordance with a preferred embodiment of the present invention.

Turning next to FIGS. 10 and 11, flowcharts illustrating code generation based on addressing modes is depicted in accordance with a preferred embodiment of the present invention. These processes also are implemented in a JIT compiler in these examples. The process in FIG. 10 is used if the LDP is conditionally defined as LD4 for 32-bit mode addressing or LD8 for 64-bit mode addressing. The process in FIG. 11 is used for an intermediate opcode that is different from LD4 or LD8.

In FIG. 10, the process continues from step 910 in FIG. 9 when the method has been processed. The process in this figure begins by obtaining an intermediate code instruction for processing (step 1000). Thereafter, a determination is made as to whether the instruction uses LD4 (step 1002). If the instruction uses LD4, then a LD4 real instruction is generated (step 1004). The LD4 real instruction is generated using a combination of the bit pattern representing the major opcode and opcode extensions and the various fields representing the actual registers. The precise layout of the fields in the instruction is explained in *The Intel IA-64 Architecture Software Developer's Manual, Volume 3: IA-64 Application Architecture, Revision* 1.1, *July* 2000, which is incorporated herein by reference. Some example code to generate the instruction is as follows:

```
case ld4:
    slot = LLcon(I1d4) ;
    slot | = regTable[ipt->target].reg_actualReg << 6) ;
    slot | = (regTable[ipt->src1].reg_actualReg << 20) ;
    break;
```

The LD8, ST4 and ST8 instructions are generated in a similar fashion. A real instruction is an instruction that is in a form for execution by the target data processing system, such as an assembly instruction. Next, a determination is made as to whether more instructions are present for processing (step 1006). If more instructions are present, the process returns to step 1000. Otherwise, the process terminates.

Referring back to step 1002, if the intermediate instruction does not use LD4, a determination is made as to whether the instruction uses LD8 (step 1008). If the instruction uses LD8, the process then generates a real LD8 instruction (step 1010) with the process then proceeding to step 1006 as described above.

If in step 1008, the intermediate instruction does not use LD8, a determination is made as to whether the instruction uses ST4 (step 1012). If the instruction uses ST4, a real ST4 instruction is generated (step 1014) with the process then proceeding to step 1006 as described above. Referring again to step 1012, if the intermediate instruction does not use ST4, a determination is made as to whether the instruction uses ST8 (step 1016). If the instruction uses ST8, a real instruction using ST8 is generated (step 1018) with the process then proceeding to step 1006 as described above.

Otherwise, other instructions are generated (step 1026). Other instructions could be for example an addition instruction 'ADD' where the opcode for add register is combined with the bits representing the real source and destination registers.

As an alternative to FIG. 10, next, in FIG. 11, the process proceeds to step 1100 from step 910 in FIG. 9 when LDP is a separate intermediate code opcode. The process begins by obtaining an intermediate code instruction for processing (step 1100). Thereafter, a determination is made as to whether the instruction uses LDP (step 1102). If the instruction uses LDP, either a LD4 for 32-bit addressing or LD8 for 64-bit mode addressing is generated (step 1104). The appropriate opcode is generated by selecting the code at compile time using conditional compilation. For example:

```
if (opcode == LDP) {
    uint64_t realop;
    #if defined __64BIT__
        realop = 0x808000000;
    #else
        realop = 0x80c000000;
    #endif
    /* more code */
}
```

Next, a determination is made as to whether more instructions are present for processing (step 1108). If more instructions are present, the process returns to step 1100. Otherwise, the process terminates.

Referring back to step 1102, if the intermediate instruction does not use LDP, a determination is made as to whether the instruction uses STP (step 1110). If the instructions uses STP, either a ST4 for 32-bit addressing or ST8 for 64-bit mode addressing is generated (step 1112) with the process then proceeding to step 1108 as described above. The process proceeds to step 1006 from step 1110 if the intermediate instruction does not use STP. At step 1006 other instructions are generated.

Turning next to FIG. 12, diagram of code in the C language illustrating macros used to represent different instructions in 32-bit and 64-bit modes of addressing is depicted in accordance with a preferred embodiment of the present invention. Code 1200 illustrates a set of macros written in the C programming language used to generate intermediate instructions, such as those in FIGS. 9–11.

The code snippets in the depicted examples are in assembly for purposes of illustration.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a data processing system for just-in-time compiling instructions, the method comprising:
   receiving a set of non-specific data processing system instructions for a method;
   identifying a particular mode of addressing from a plurality of different modes of addressing; and
   compiling the set of non-specific data processing system instructions using an intermediate code generation process to generate a set of intermediate instructions for execution using the identified particular mode of addressing.

2. A process in a data processing system for just-in-time compiling instructions, the method comprising:
   receiving a set of non-specific data processing system instructions for a method; and
   compiling the set of non-specific data processing system instructions using an intermediate code generation process to generate a set of intermediate instructions for execution using a particular mode of addressing, wherein the compiling step comprises:
      generating at least one intermediate instruction for each instruction in the set of non-specific data processing system instructions for the method to thereby create the set of intermediate instructions; and
      generating a set of instructions from the set of intermediate instructions, the set of instructions having a mode of addressing specific to the particular mode of addressing.

3. The process of claim 1 further comprising a step of placing addresses into a set of functions, wherein the intermediate instructions call a subroutine from the set of functions.

4. The process of claim 1, wherein the set of non-specific data processing system instructions is a set of bytecodes.

5. The process of claim 3, wherein the steps of receiving, placing, and compiling are implemented in a just-in-time compiler.

6. A process in a data processing system for just-in-time compiling instructions, the method comprising:
   receiving a set of non-specific data processing system instructions for a method; and
   compiling the set of non-specific data processing system instructions using an intermediate code generation process to generate a set of intermediate instructions for execution using a particular mode of addressing, wherein the steps of receiving, placing, and compiling are implemented in a just-in-time compiler and wherein the just-in-time compiler is written in instructions having data structures in which the instructions are recompiled to run in a selected mode of addressing which is different from the particular mode of addressing.

7. The process of claim 1 further comprising a step of placing addresses into a set of functions, wherein the addresses are to subroutines used to perform functions specified in the a set of non-specific data processing system instructions for the method.

8. The process of claim 6 further comprising a step of placing addresses into a set of functions, wherein the addresses are calculated at initialization of the compiler.

9. The process of claim 1, wherein the mode of addressing is one of a 32 bit mode of addressing and a 64 bit mode of addressing.

10. A process in just-in-time compiler used for processing bytecodes, the process comprising the computer implemented steps of:
    receiving a method for just in time compilation, wherein the method contains a plurality of bytecodes;
    generating a set of intermediate instructions for the plurality of bytecodes;
    identifying a mode of addressing for the method to form an identified mode of addressing; and
    generating a set of native instructions from the set of intermediate instructions, wherein the set of native instructions are for execution by a data processing system using the identified mode of addressing.

11. The process of claim 10 further comprising:
    placing addresses into a set of functions in the just-in-time compiler.

12. The process of claim 11, wherein the addresses are determined when the just-in-time compiler is initialized.

13. The process of claim 10, wherein the identified mode of addressing is one of a 32 bit mode of addressing and a 64 bit mode of addressing.

14. The process of claim 10, wherein the bytecodes are Java bytecodes.

15. A data processing system comprising:
    a bus system;
    a communications adapter connected to the bus system;
    a memory including a set of instructions connected to the bus system; and
    a processing unit connected to the bus system, wherein the processing unit executes the set of instructions to receive a method for just in time compilation in which the method contains a plurality of bytecodes, generate a set of intermediate instructions for the plurality of bytecodes, identify a mode of addressing for the method to form an identified mode of addressing, and generate a set of native instructions from the set of intermediate instructions in which the set of native instructions are for execution by a data processing system using the identified mode of addressing.

16. The data processing system of claim 15, wherein the processor unit includes a set of processors.

17. The data processing system of claim 15, wherein the processor unit includes a single processor.

18. The method claim 15, wherein the bus system includes a primary bus and a secondary bus.

19. A data processing system for just-in-time compiling instructions comprising:
    receiving means for receiving a set of non-specific data processing system instructions for a method;
    identifying means for identifying a particular mode of addressing from a plurality of different modes of addressing; and
    compiling means for compiling the set of non-specific data processing system instructions using an intermediate code generation process to generate a set of intermediate instructions for execution using the identified particular mode of addressing.

20. A data processing system for just-in-time compiling instructions comprising:
    receiving means for receiving a set of non-specific data processing system instructions for a method; and
    compiling means for compiling the set of non-specific data processing system instructions using an intermediate code generation process to generate a set of intermediate instructions for execution using a particular mode of addressing, wherein the compiling means comprises:

first generating means for generating at least one intermediate instruction for each instruction in the set of non-specific data processing system instructions for the method to thereby create the set of intermediate instructions; and second generating means for generating a set of instructions from the set of intermediate instructions, the set of instructions having a mode of addressing specific to the particular mode of addressing.

21. The data processing system of claim 19 further comprising placing means for placing addresses into a set of functions, wherein the intermediate instructions call a subroutine from the set of functions.

22. The data processing system of claim 19, wherein the set of non-specific data processing system instructions is a set of bytecodes.

23. The data processing system of claim 21, wherein the receiving means, placing means, and compiling means are implemented in a just-in-time compiler.

24. A data processing system for just-in-time compiling instructions comprising:

receiving means for receiving a set of non-specific data processing system instructions for a method; and compiling means for compiling the set of non-specific data processing system instructions using an intermediate code generation process to generate a set of intermediate instructions for execution using a particular mode of addressing, wherein the receiving means, placing means, and compiling means are implemented in a just-in-time compiler and wherein the just-in-time compiler is written in instructions having data structures in which the instructions are recompiled to run in a selected mode of addressing which is different from the particular mode of addressing.

25. The data processing system of claim 19 further comprising means for placing addresses into a set of functions, wherein the addresses are to subroutines used to perform functions specified in the a set of non-specific data processing system instructions for the method.

26. The data processing system of claim 24 further comprising means for placing addresses into a set of functions, wherein the addresses are calculated at initialization of the compiler.

27. The data processing system of claim 19, wherein the mode of addressing is one of a 32 bit mode of addressing and a 64 bit mode of addressing.

28. A just-in-time compiler in a data processing system, wherein the just-in-time is used for processing bytecodes, the just-in-time compiler comprising receiving means for receiving a method for just in time compilation, wherein the method contains a plurality of bytecodes;

first generating means for generating a set of intermediate instructions for the plurality of bytecodes;

identifying means for identifying a mode of addressing for the method to form an identified mode of addressing; and second generating means for generating a set of native instructions from the set of intermediate instructions, wherein the set of native instructions are for execution by a data processing system using the identified mode of addressing.

29. The process of claim 28 further comprising:

placing addresses into a set of functions in the just-in-time compiler.

30. The process of claim 29, wherein the addresses are determined when the just-in-time compiler is initialized.

31. The process of claim 28, wherein the identified mode of addressing is one of a 32 bit mode of addressing and a 64 bit mode of addressing.

32. A computer program product on a computer readable medium for compiling instructions, wherein the computer program product comprises:

first instructions for receiving a set of non-specific data processing system instructions for a method; and second instructions for compiling the set of non-specific data processing system instructions using an intermediate code generation process to generate a set of intermediate instructions for execution using a particular mode of addressing, wherein the second instructions comprises:

third instructions for generating at least one intermediate instruction for each institution in the set of non-specific data processing system instructions for the method to thereby create the set of intermediate instructions; and fourth instructions for generating a set of instructions having a mode of addressing specific to the particular mode of addressing from the set of intermediate instructions.

33. A computer program product in a computer readable medium for processing bytecodes, the computer program product comprising:

first instructions for receiving a method for just in time compilation, wherein the method contains a plurality of bytecodes;

second instructions for generating a set of intermediate instructions for the plurality of bytecodes;

third instructions for identifying a mode of addressing for the method to form an identified mode of addressing; and fourth instructions for generating a set of native instructions from the set of intermediate instructions, wherein the set of native instructions are for execution by a data processing system using the identified mode of addressing.

* * * * *

UNITED STATES PATENT AND TRADEMARK OFFICE
CERTIFICATE OF CORRECTION

PATENT NO. : 6,704,926 B1 Page 1 of 1
DATED : March 9, 2004
INVENTOR(S) : Blandy et al.

It is certified that error appears in the above-identified patent and that said Letters Patent is hereby corrected as shown below:

<u>Column 14,</u>
Line 47, after "18. The", delete "method" and insert -- data processing system of --.

Signed and Sealed this

Thirteenth Day of September, 2005

JON W. DUDAS
*Director of the United States Patent and Trademark Office*